United States Patent [19]
Kojima et al.

[11] Patent Number: 5,699,467
[45] Date of Patent: Dec. 16, 1997

[54] OPTICAL FIBER COMPLEX OVERHEAD LINE

[75] Inventors: Toru Kojima; Koji Yoshida; Yukikatsu Aida, all of Tokyo, Japan

[73] Assignee: The Furukawa Electric Co., Ltd., Tokyo, Japan

[21] Appl. No.: 659,535

[22] Filed: Jun. 6, 1996

[30] Foreign Application Priority Data

Jun. 6, 1995 [JP] Japan .................. 7-139397

[51] Int. Cl.$^6$ .................................. G02B 6/44
[52] U.S. Cl. .................. 385/110; 385/106; 385/112
[58] Field of Search .................. 385/100–114

[56] References Cited

U.S. PATENT DOCUMENTS 4,775,213  10/1988  Kitayama ................... 385/110
5,345,525  9/1994  Holman et al. ............. 385/106 X

FOREIGN PATENT DOCUMENTS 62-147216  9/1987  Japan .
2-41333    3/1990  Japan .

*Primary Examiner*—Phan T. H. Palmer
*Attorney, Agent, or Firm*—Nikaido Marmelstein Murray & Oram LLP

[57] ABSTRACT

An optical fiber complex overhead line including a spacer formed with a plurality of helical grooves in its outer periphery extending along the axial direction, each helical groove shaped to be able to accommodate at least two bundles of multi-core type optical fiber in the width direction of the groove, at least two bundles of multi-core type optical fiber accommodated in each of the helical grooves, a protective optical fiber covering accommodating the spacer, and a plurality of conductor strands arranged around the protective optical fiber covering.

11 Claims, 5 Drawing Sheets

OPTICAL FIBER COMPLEX OVERHEAD LINE

BACKGROUND OF THE INVENTION

1. Field of the Invention

The present invention relates to an optical fiber complex overhead line used as an overhead transmission line or overhead ground line arranged between steel towers.

2. Description of the Related Art

To protect and control the system of an overhead transmission line or overhead ground line arranged between steel towers or to transmit special signals through an optical fiber, use is sometimes made of an optical fiber complex overhead line.

As such an optical fiber complex overhead line, there is known the one shown in Japanese Unexamined Utility Model Publication (Kokai) No. 62-147216. This type of optical fiber complex overhead line is comprised of an optical fiber unit positioned at its center and a large number of metal strands positioned at its outer circumference. The optical fiber unit is comprised in turn of a spacer formed with helical grooves in which the optical fibers are accommodated and the spacer itself is accommodated in a protective covering formed from aluminum etc.

In this optical fiber complex overhead line, one optical fiber is accommodated in one helical groove of the spacer of the optical fiber unit.

In such a configuration where a single optical fiber is accommodated in a single helical groove of the spacer, the number of the optical fibers which can be carried by a single optical fiber complex overhead line is limited and the number of signals which can be transmitted in parallel by a single optical fiber complex overhead line is limited as well.

Therefore, to increase the number of optical fibers which can be carried by a single optical fiber complex overhead line, it has been considered for example to replace a simple optical fiber with a bundle of optical fibers, for example, 14 optical fibers.

However, when replacing the optical fiber with a bundle of 14 or so optical fibers, the outer diameter of the bundle becomes larger, the helical grooves have to be made larger as well and, in the end, the outer diameter of the spacer also becomes larger. Therefore, the wind load and ice and snow load received by the optical fiber complex overhead line when stretched between steel towers become larger and a larger strength is required for the steel tower supports, thereby making it difficult to replace existing overhead transmission lines with optical fiber complex overhead lines. Further, increasing the number of optical fibers requires increasing the number of cradles of the optical fiber bundling device, which not only makes the optical fiber bundling device larger but also greatly increases the costs.

Another method which has been considered has been to increase the number of helical grooves formed in the outer periphery of the spacer.

Increasing the number of helical grooves formed in the spacer, however, requires increasing the outer diameter of the spacer in view of the strength of the walls separating adjoining helical grooves, which makes the outer diameter of the optical fiber unit larger. As a result, the wind load and the ice and snow load received when the optical fiber complex overhead line is stretched between steel towers become larger and a larger strength is required of the supports of the steel tower, so it is difficult to replace existing overhead transmission lines with optical fiber complex overhead lines.

An optical fiber complex overhead line comprised of a plurality of single optical fibers arranged in parallel to form ribbon-like optical fiber tapes which are accommodated laid over each other in the helical grooves of the spacer has also been proposed (for example, see Japanese Unexamined Utility Model Publication (Kokai) No. 2-41333).

In this type of optical fiber complex overhead line, however, when the composite optical line is wound on a drum etc. or when the composite optical line is bent during use, the bottom optical fiber tapes will be subjected to pressure by the tension applied to the top optical fiber tapes, which may cause a deterioration of the transmission characteristics.

SUMMARY OF THE INVENTION

The present invention was made in consideration of the above problems in the related art and has as its object to provide an optical fiber complex overhead line which does not require a large, expensive multifiber bundling device for bundling 12, 16, or other numbers of fibers, enables the optical fiber unit to be kept small and transmission characteristics good, and enables the number of optical fibers able to be accommodated by a single optical fiber complex overhead line to be increased.

To achieve the above object, there is provided an optical fiber complex overhead line comprising a spacer formed with a plurality of helical grooves in its outer periphery extending along the axial direction. Each helical groove is shaped to be able to accommodate at least two bundles of multi-core type optical fiber in the width direction of the groove. At least two bundles of multi-core type optical fiber are accommodated in each of the helical grooves. A protective optical fiber covering accommodating the spacer, and a plurality of conductor strands are arranged around the protective optical fiber covering.

Preferably, the helical grooves are helical grooves with an angular cross-sections arranged at four equidistant positions in the outer periphery of the spacer.

Preferably, the bundle of multi-core type optical fiber has six or eight optical fibers.

The spacer may be comprised of aluminum or an aluminum alloy. The helical grooves of the spacer may be formed by cutting.

The dimensions of the helical grooves formed in the spacer are, where the outer diameter of the spacer is D, preferably a width w of the groove of $(0.310) \times D$ to $(0.496) \times D$ and a depth d of the groove of $(0.186) \times D$ to $(0.372) \times D$.

The minimum dimension of the thickness of the spacer is preferably more than $0.060 \times D$.

The protective covering may be comprised of aluminum, aluminum alloy, stainless steel, etc.

The two or more bundles of multi-core type optical fibers accommodated in each of the helical grooves of the spacer may have the same number of optical fibers or different numbers. Further, it is not necessary to accommodate two or more bundles of multi-core type optical fiber in all of the helical grooves. It is also possible to accommodate two or more bundles of multi-core type optical fiber in just some predetermined, helical grooves.

Since the optical fiber complex overhead line of the present invention can accommodate at least two bundles of multi-core type optical fibers having six, eight, or more optical fibers in at least one of its helical grooves, it is possible to increase the number of optical fibers accommodated to the maximum. As a result, the large and expensive bundling device required for manufacturing bundles of 12, 16, or more optical fibers becomes unnecessary, so it is possible to prevent increases in costs.

Further, since the optical fiber complex overhead line of the present invention does not increase the number of helical grooves but accommodates a plurality of bundles of multi-core type optical fibers in a single helical groove, there is no reduction of strength of the partitions between grooves and the optical fiber unit is not made large in size. Therefore, the wind load and ice and snow load received when the optical fiber complex overhead line is stretched between steel towers can be kept from increasing and a greater strength is not demanded from the steel tower supports, so it becomes possible to replace existing overhead transmission lines with optical fiber complex overhead lines.

Still further, the optical fiber complex overhead line of the present invention accommodates in its helical grooves not ribbon-like optical fiber tapes, but bundles of multi-core type optical fibers which can be accommodated in parallel in the width direction of the grooves rather than being stacked in the grooves. Therefore, there is no pressure or other effect on the other bundles of multi-core type optical fibers even when tension is applied to the one bundle of multi-core type optical fibers, and therefore a reduction in the transmission characteristics may be prevented.

When the helical grooves of the present invention are helical grooves of an angular cross-section formed at four equidistant positions on the outer periphery of the spacer, a more preferable optical fiber complex overhead line in terms of the efficiency of accommodation of the optical fiber bundles in the helical grooves, size of the optical fiber unit, and strength of the spacer results.

BRIEF DESCRIPTION OF THE DRAWINGS

These and other objects and features of the present invention will become more apparent from the following description of the related art and preferred embodiments made with reference to the attached drawings, in which.

DESCRIPTION OF THE PREFERRED EMBODIMENTS

Figure 1:
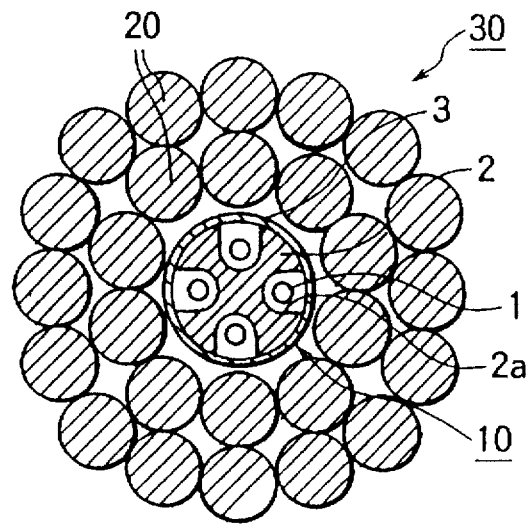
FIG. 1 is a cross-sectional view of an optical fiber complex overhead line according to a related art.

Before explaining the preferred embodiments of the optical fiber complex overhead line according to the present invention, a more detailed explanation will be given of an optical fiber complex overhead line according to the related art referring to FIG. 1.

This type of optical fiber complex overhead line is comprised of an optical fiber unit 10 positioned at its center and a plurality of metal strands 20 positioned at the outer periphery of the same. The optical fiber unit 10 is comprised of a spacer 2 formed with helical grooves 2a in which the optical fibers 1 are accommodated and a protective covering 3 formed from aluminum etc which accommodates the spacer 2.

In this optical fiber complex overhead line, one optical fiber 1 is accommodated in one helical groove 2a of the spacer of the optical fiber unit.

In such a configuration where a single optical fiber 1 is accommodated in a single helical groove 2a of the spacer, the number of the optical fibers which can be carried by a single optical fiber complex overhead line is limited and the number of signals which can be transmitted in parallel by a single optical fiber complex overhead line is limited as well.

Therefore, to increase the number of the optical fibers which can be carried by a single optical fiber complex overhead line, it has been considered for example to make the optical fiber 1 shown in FIG. 1 a bundle of multi-core type optical fiber, for example, multi-core type optical fiber having 14 optical fibers. However, when making the optical fiber 1 shown in FIG. 1 a bundle of 14 or so optical fibers, the outer diameter becomes larger and the helical grooves 2a shown in FIG. 1 have to be made larger as well and, in the end, the outer diameter of the spacer 2 also becomes larger. Therefore, the wind load and ice and snow load received by the optical fiber complex overhead line when stretched between steel towers become larger and a larger strength is required for the steel tower supports, thereby making it difficult to replace existing overhead transmission lines with optical fiber complex overhead lines. Further, increasing the number of optical fibers 1 requires increasing the number of cradles of the optical fiber bundling device, which not only makes the optical fiber bundling device larger but also greatly increases the costs.

Another method which has been considered has been to increase the number of helical grooves 2a formed in the outer periphery of the spacer 2.

Increasing the number of helical grooves 2a formed in the spacer 2, however, requires increasing the outer diameter of the spacer 2 in view of the strength of the walls separating adjoining helical grooves, which makes the outer diameter of the optical fiber unit 10 larger. As a result, the wind load and the ice and snow load received when the optical fiber complex overhead line is stretched between steel towers become larger and a larger strength is required of the supports of the steel tower, so it is difficult to replace existing overhead transmission lines with optical fiber complex overhead lines.

Therefore, the optical fiber complex overhead line of the present invention has been developed.

An embodiment of the present invention will be explained below based on the drawings.

Figure 2:
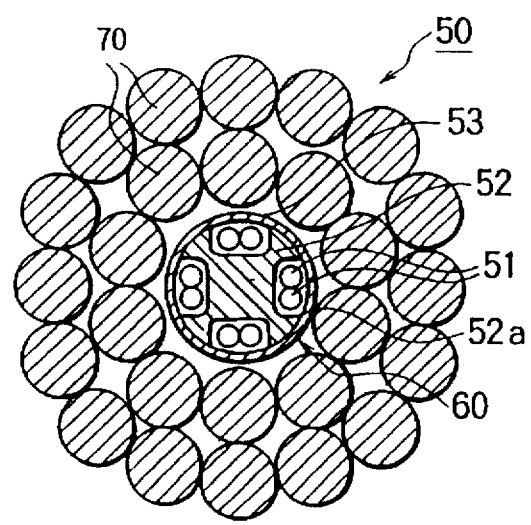
FIG. 2 is a cross-sectional view of an optical fiber complex overhead line according to a first embodiment of the present invention.

As shown in FIG. 2, the optical fiber complex overhead line of the present embodiment is comprised of an optical fiber unit 60 provided with a spacer 52 and a protective optical fiber covering 53 accommodating the spacer 52. Around the optical fiber unit 60 on the periphery of the protective optical fiber covering 53 are stranded a plurality of conductors or metal strands 70. These strands 70 are comprised for example of aluminum, aluminum alloy, aluminum coated steel, galvanized steel, and other metal strands.

Figure 3:
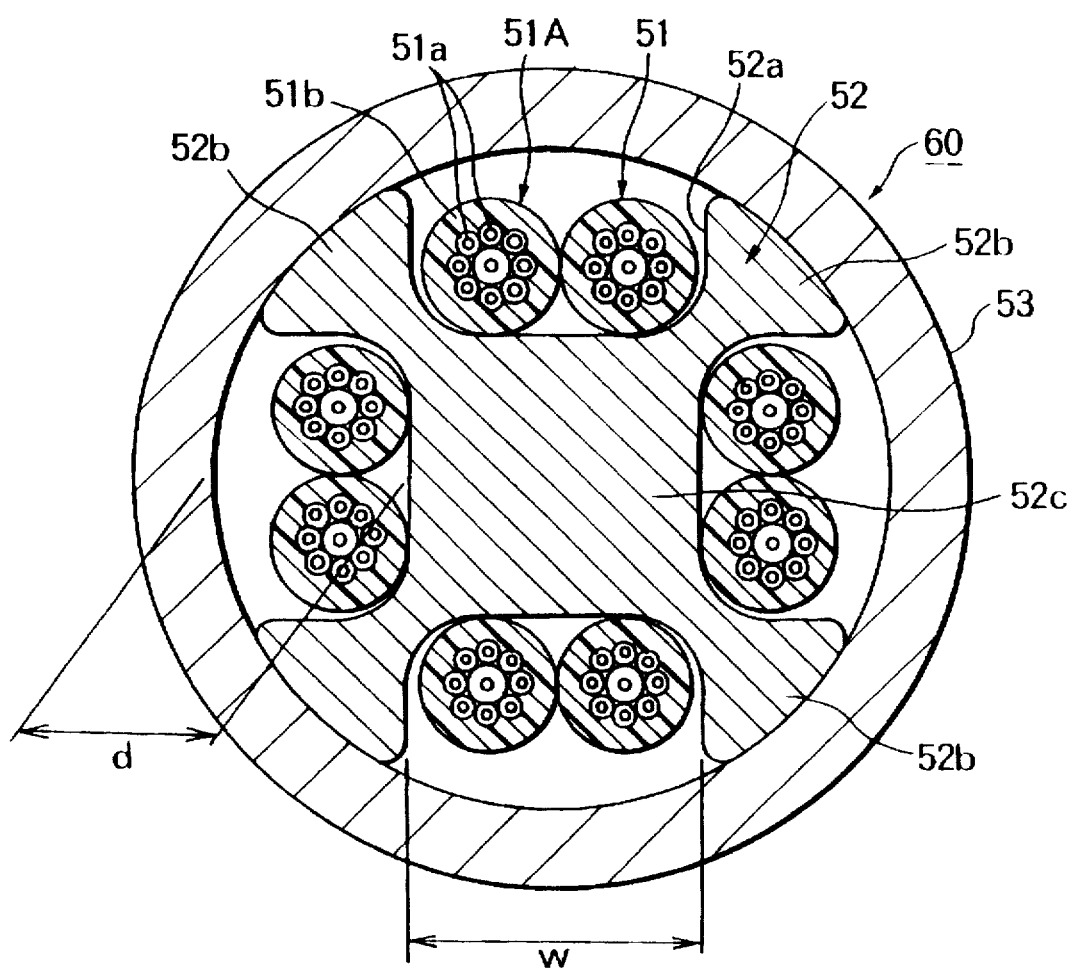
FIG. 3 is a cross-sectional view of the optical fiber unit shown in FIG. 2.

The spacer 52, as shown in FIG. 3, is formed on its outer periphery with four helical grooves 52a. Projections 52b are formed between these helical grooves 52a. Each of these plurality of helical grooves 52a, as shown in FIG. 3, can accommodate two bundles 51 of multi-core type optical fiber in parallel in the width direction of the groove. The center portion 52c of the spacer is for receiving the tension applied to the optical fiber complex overhead line 10.

The dimensions of the helical grooves 52a formed in the spacer 52 are not particularly limited, but when the outer diameter D of the spacer 52 is made 6.45 mm, the width w of the groove (see FIG. 3) is preferably about 2.8 mm and the depth d of the groove unit 60 preferably about 1.75 mm. The minimum thickness of the spacer 52 (the portion between the grooves) is preferably more than 0.060×D.

Figure 4A:
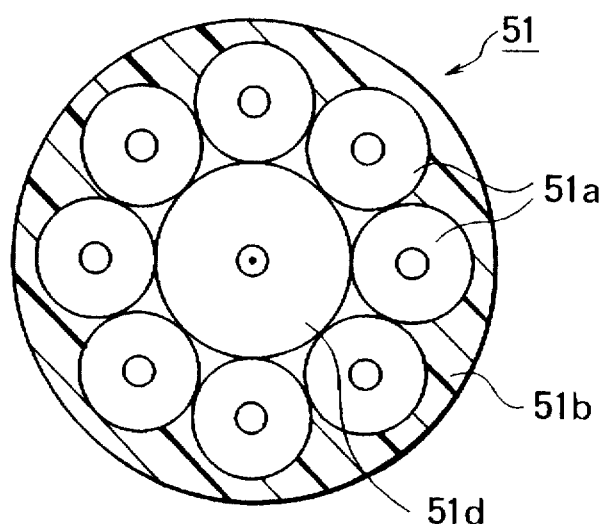
FIG. 4A is a cross-sectional view of an example of a multi-core type optical fiber.

The multi-core type optical fiber bundle 51 of the present invention, as shown in FIG. 4A, is comprised of a plurality (nine in the embodiment shown in FIG. 4A) of optical fibers 51a and 51d each comprised of optical fiber glass coated with a UV cured matrix resin which are bundled together and coated as a bundle with a matrix resin 51b. Note that the optical fibers 51a and 51d may be made of optical fiber glass coated with a silicone resin etc. as well. Further, the optical fiber 51d positioned at the center is a so-called dummy fiber which is formed of optical fiber glass or fiber reinforced plastic (FRP) coated by a UV cured matrix resin, silicone resin, etc. Accordingly, while the multi-core type optical fiber bundle 51 shown in FIG. 4A is formed by bundling nine optical fibers 51a and 51d, only the eight multi-core type optical fibers 51a positioned at the outside are used for the transmission of information.

Figure 4B:
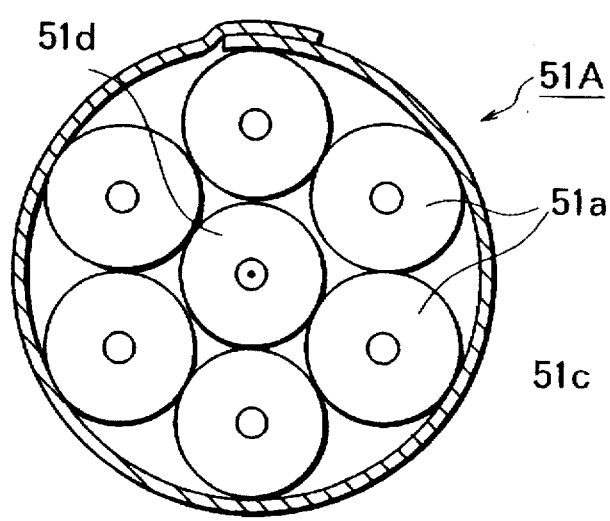
FIG. 4B is a cross-sectional view of another example of a multi-core type optical fiber.
Figure 5:
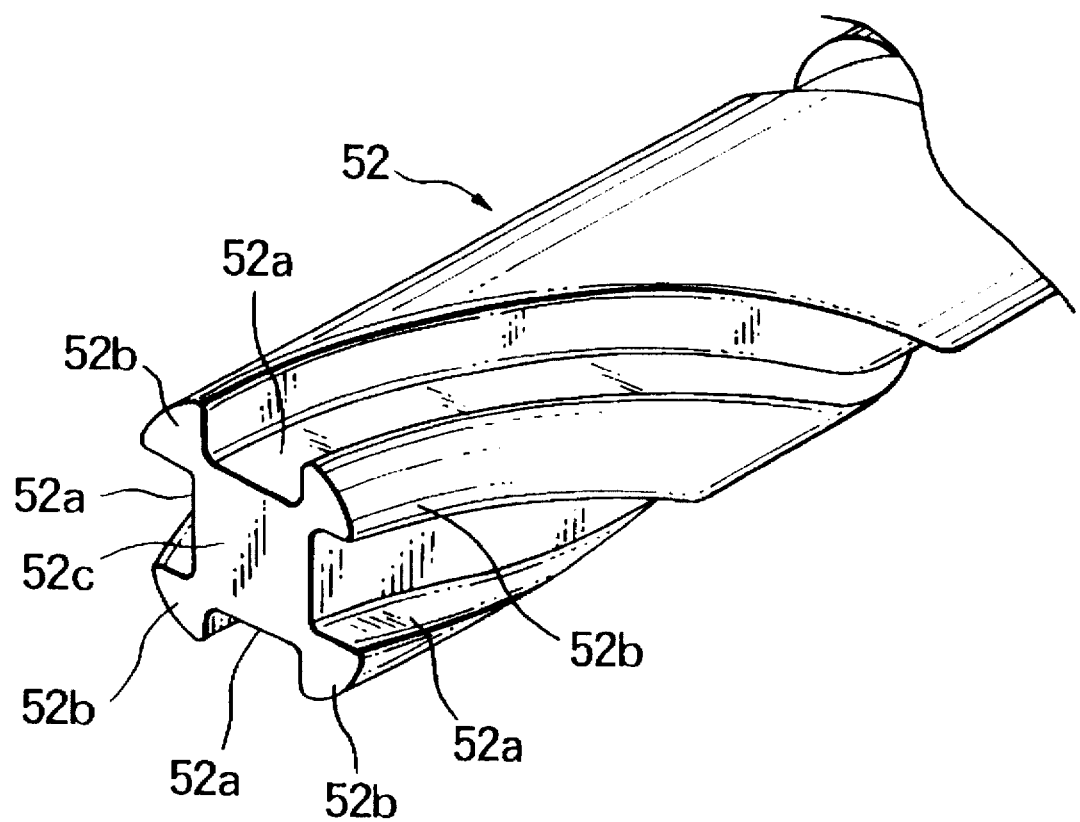
FIG. 5 is a perspective view of key parts of a spacer.

The multi-core type optical fiber bundle 51 according to the present embodiment is, as explained above, formed by coating a bundle of a plurality of optical fibers by a matrix resin. Note that as shown in FIG. 4B, for example, it is possible to cover the bundle of the plurality of optical fibers 51a with a heat resistant tape 51c to form the optical fiber bundle 51A. As the heat resistant tape, mention may be made of a polytetrafluoroethylene (PTFE) or other fluororesin tape.

The number of the optical fibers 51a and 51d which are bundled is not particularly limited and may be for example made seven as shown in FIG. 4B instead of the nine shown in FIG. 4A. In the case shown in FIG. 4B as well, the optical fiber 51d positioned at the center is a so-called dummy fiber which is formed of optical fiber glass or FRP coated with a UV cured matrix resin, silicone resin, etc. Accordingly, in the multi-core type optical fiber bundle 51a shown in FIG. 4B, only the six optical fibers positioned at the outside are used for the transmission of information.

The multi-core type optical fiber bundles 51 and 51A shown in FIG. 4A and FIG. 4B are accommodated in the helical grooves 52a formed in the outer periphery of the spacer 52. In this embodiment, four angular cross-section helical grooves 52a are formed equidistantly in the outer periphery of the spacer 52. The spacer 52 is for example comprised of aluminum or another metal and the helical grooves 52a can be formed by extruding a rod shaped material. In addition to extrusion, it may be formed by drawing or cutting. By not increasing the number of the helical grooves 52a, but increasing the sectional area of each helical groove 52a as in this embodiment, it is possible to maintain the strength of the walls formed between the helical grooves 52a and to increase the number of optical fibers accommodated in a single optical fiber complex overhead line without increasing the size of the spacer 52. Further, making the number of the helical grooves 52a four or so simplifies the shape of the die and thereby improves the shapeability of the spacer 52.

Note that the helical grooves 52a can each accommodate a plurality of multi-core type optical fiber bundles 51a, but it is not necessary to accommodate a plurality of multi-core type optical fiber bundles 51 and 51A in all of the helical grooves 52a.

The spacer 52 with the helical grooves 52a accommodating the optical fiber bundles 51 is, as shown in FIG. 3, accommodated in a protective optical fiber covering 3 made of aluminum for example to constitute the optical fiber unit 60. As shown in FIG. 2, around the optical fiber unit 60 on the periphery of the protective optical fiber covering 53 are stranded a plurality of conductors or metal strands 70, thereby forming the optical fiber complex overhead line 50.

Since the optical fiber complex overhead line 50 of the embodiment configured in this way can accommodate at least two bundles of six, eight, or more optical fibers in at least one of its helical grooves 52a, it is possible to increase the number of optical fibers 51a accommodated to the maximum. As a result, the large and expensive bundling device required for manufacturing bundles of 12, 16, or more optical fibers becomes unnecessary, so it is possible to prevent increases in costs.

Further, since the optical fiber complex overhead line 50 of the embodiment does not increase the number of helical grooves 52a but accommodates a plurality of optical fiber bundles 51 or 51A in a single helical groove 52a, there is no reduction of strength of the projections 52b between grooves and the optical fiber unit 60 is not made large in size. Therefore, the wind load and ice and snow load received when the optical fiber complex overhead line 50 is stretched between steel towers 80, 80 as an overhead ground line 50a or overhead transmission line 50b as shown in FIG. 6 can be kept from increasing and a greater strength is not demanded from the steel tower supports, so it becomes possible to replace existing overhead transmission lines with optical fiber complex overhead lines.

Still further, the optical fiber complex overhead line 50 of embodiment accommodates in its helical grooves 52a not ribbon-like optical fiber tapes, but optical fiber bundles 51 or 51A which can be accommodated in parallel in the width direction of the grooves rather than being stacked in the grooves. Therefore, there is no pressure or other effect on the other optical fiber bundles 51 or 51A even when tension is applied to an optical fiber bundle 51 or 51A and therefore a reduction in the transmission characteristics may be prevented.

Figure 6:
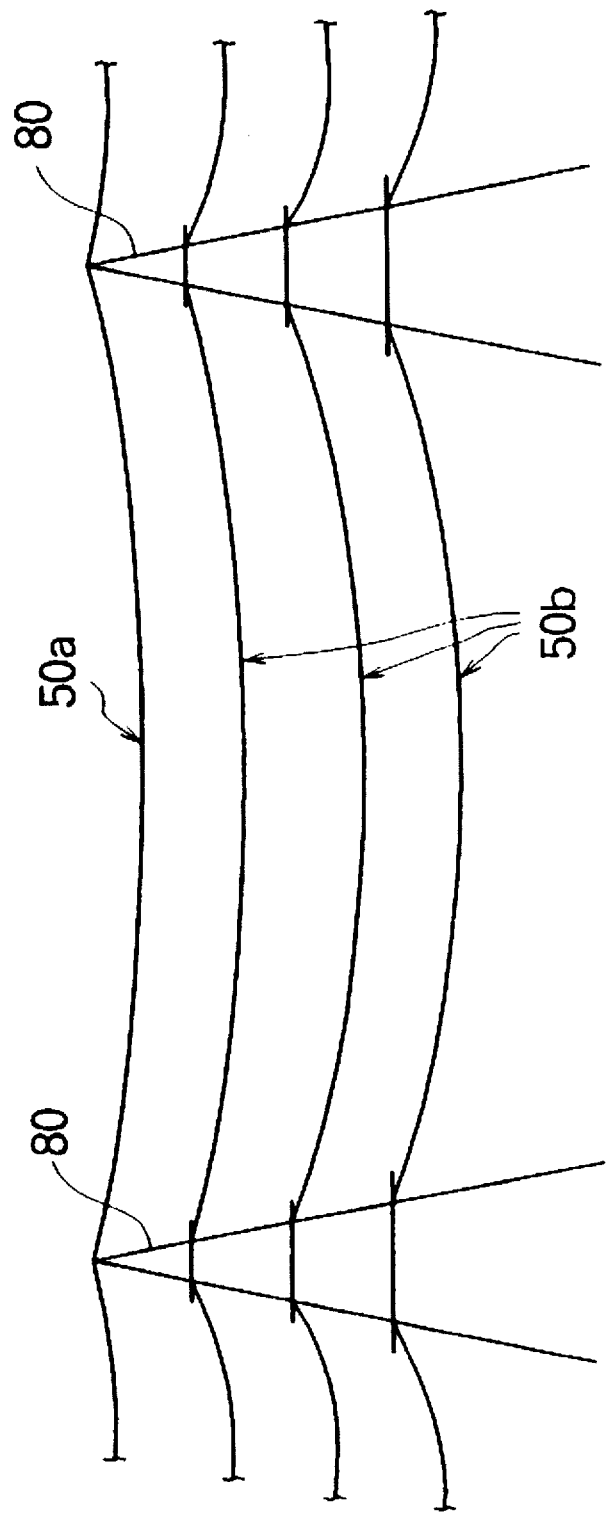
FIG. 6 is a view of the state of an overhead ground line and overhead transmission line in the air.

The optical fiber complex overhead line 50 according to this embodiment, as shown in FIG. 6 for example, may be used as an overhead ground line 50a or overhead transmission line 50b stretched between steel towers 80, 80. The information transmitted by the optical fibers 51a of the optical fiber complex overhead line 50 is not particularly limited and may be telephone speech, weather information, etc.

Note that the present invention is not limited to the above embodiment. Various modifications are possible within the scope of the invention.

For example, the helical grooves 52a of the spacer 52 may accommodate three or more optical fiber bundles.

Further, three or five helical grooves 52a may be formed at the outer periphery of the spacer 52 so long as they are shaped to allow at least two multi-core type optical fiber bundles to be arranged in them in parallel in the width direction of the grooves.

Further, it is not necessary to accommodate a plurality of multi-core type optical fiber bundles 51 or 51A in all of the helical grooves 52a of the spacer 52. It is also possible to accommodate a plurality of multi-core type optical fiber bundles 51 or 51A in Just some of the helical grooves 52a. Also, it is not necessary to provide multi-core type optical fiber bundles 51 or 51A of the same number of optical fibers in all of the helical grooves 52a. Optical fiber bundles 51 or 51A of different numbers of fibers may be arranged in a mixed state.

As mentioned above, according to the present invention, it is possible to increase the number of the optical fibers accommodated and increase the amount of information able to be transmitted without increasing the outer diameter of the optical fiber complex overhead line.

Further, in the present invention, a large and expensive bundling device required for manufacturing bundles of 12, 16, or more optical fibers becomes unnecessary, so it is possible to prevent increases in costs.

Further, since it is possible to prevent the optical fiber unit from becoming large in size, the wind load and ice and snow load received when the optical fiber complex overhead line is stretched between steel towers can be kept from increasing and a greater strength is not demanded from the steel tower supports, so it becomes possible to replace existing overhead transmission lines with optical fiber complex overhead lines.

Still further, the optical fiber complex overhead line of the present invention accommodates in its helical grooves not ribbon-like optical fiber tapes, but bundles of optical fibers which can be accommodated in parallel in the width direction of the grooves rather than being stacked in the grooves. Therefore, there is no pressure or other effect on the other bundles of optical fibers even when tension is applied to a bundle of optical fibers and therefore a reduction in the transmission characteristics may be prevented.

When the helical grooves of the present invention are helical grooves of an angular cross-section formed at four equidistant positions on the outer periphery of the spacer, a more preferable optical fiber complex overhead line in terms of the efficiency of accommodation of the optical fiber bundles in the helical grooves, size of the optical fiber unit, and strength of the spacer results.

We claim:

1. An optical fiber complex overhead line comprising;
   a spacer having a plurality of helical grooves in its outer periphery extending in an axial direction, wherein each helical groove is shaped to be able to accommodate at least two bundles of multi-core type optical fiber in a width direction of the helical groove,
   at least two side by side bundles of multi-core type optical fiber in at least one of the helical grooves,
   a protective covering over said spacer enclosing said bundles, and
   a plurality of conductor strands arranged around the protective covering.

2. The optical fiber complex overhead line as set forth in claim 1, wherein the helical grooves have angular cross-sections each arranged at four equidistant positions in the outer periphery of the spacer.

3. The optical fiber complex overhead line as set forth in claim 1, wherein the bundle of multi-core type optical fiber has six to eight optical fibers.

4. The optical fiber complex overhead line as set forth in claim 1, wherein the spacer comprises one of aluminum and an aluminum alloy.

5. The optical fiber complex overhead line as set forth in claim 1, wherein the at least two bundles of multi-core type optical fiber accommodated in each of the helical grooves have the same number of optical fibers.

6. The optical fiber complex overhead line as set forth in claim 1, wherein the at least two bundles of multi-core type optical fibers accommodated in each of the helical grooves have different numbers of optical fibers.

7. The optical fiber complex overhead line as set forth in claim 1, wherein the helical grooves of the spacer are formed by cutting.

8. The optical fiber complex overhead line as set forth in claim 1, wherein the dimensions of the helical grooves formed in the spacer are, where the outer diameter of the spacer is D, a width w of the groove of $(0.310) \times D$ to $(0.496) \times D$ and a depth d of the groove of $(0.186) \times D$ to $(0.372) \times D$.

9. The optical fiber complex overhead line as set forth in claim 1, wherein the dimensions of the helical grooves are designed, so that the minimum thickness of the spacer is more than $0.060 \times D$, where the outer diameter of the spacer is D.

10. The optical fiber complex overhead line as set forth in claim 1, wherein each groove has at least two side by side optical fiber bundles therein.

11. The optical fiber complex overhead line as set forth in claim 1, wherein said at least two side by side optical fiber bundles are accommodated in at least one helical groove in parallel in the width direction of the helical groove.

* * * * *